US011145199B1

(12) United States Patent
Kavaler et al.

(10) Patent No.: US 11,145,199 B1
(45) Date of Patent: Oct. 12, 2021

(54) APPARATUS AND METHOD FOR TWO-WAY SIGNALING WITH TRAFFIC CONTROLLERS OVER A WIRELESS LINK

(71) Applicant: Sensys Networks, Inc., Berkeley, CA (US)

(72) Inventors: Robert Kavaler, Kensington, CA (US); Amine Haoui, Berkeley, CA (US); Sophia Haoui, Berkeley, CA (US)

(73) Assignee: SENSYSNETWORKS, INC., Berkeley, CA (US)

( * ) Notice: Subject to any disclaimer, the term of this patent is extended or adjusted under 35 U.S.C. 154(b) by 0 days.

(21) Appl. No.: 15/813,131

(22) Filed: Nov. 14, 2017

Related U.S. Application Data

(60) Provisional application No. 62/421,384, filed on Nov. 14, 2016.

(51) Int. Cl.
*G08G 1/083* (2006.01)

(52) U.S. Cl.
CPC .................. *G08G 1/083* (2013.01)

(58) Field of Classification Search
CPC ..................................... G08G 1/083
USPC ............................................ 340/923
See application file for complete search history.

(56) References Cited

U.S. PATENT DOCUMENTS

| | | | | |
|---|---|---|---|---|
| 5,539,398 A * | 7/1996 | Hall | ........... | G08G 1/087 340/906 |
| 5,977,883 A * | 11/1999 | Leonard | ......... | G08G 1/087 340/902 |
| 9,805,595 B1 * | 10/2017 | Liebinger | ......... | G08G 1/0145 |
| 2003/0063015 A1 * | 4/2003 | Ebner | .......... | G08G 1/081 340/907 |
| 2005/0046597 A1 * | 3/2005 | Hutchison | ........ | G01S 13/92 340/917 |
| 2005/0137782 A1 * | 6/2005 | Shinada | .......... | G08G 1/0965 701/117 |
| 2007/0030857 A1 * | 2/2007 | Fulknier | .......... | H04L 45/00 370/401 |
| 2008/0094250 A1 * | 4/2008 | Myr | ........... | G08G 1/04 340/909 |
| 2010/0073194 A1 * | 3/2010 | Ghazarian | ........ | G08G 1/017 340/901 |
| 2011/0040894 A1 * | 2/2011 | Shrum, Jr. | ...... | H04L 65/4084 709/246 |
| 2013/0162449 A1 * | 6/2013 | Ginsberg | .......... | G08G 1/095 340/910 |

(Continued)

*Primary Examiner* — Omar Casillashernandez
(74) *Attorney, Agent, or Firm* — Earle Jennings

(57) ABSTRACT

Several implementations of an access point, an application server, and instances of an application operating upon a cell phone are disclosed. These implementations support the cell phone and its application traveling on a vehicle, which wirelessly communicates through a wireless router, such as a Bluetooth router with an access point situated in a cabinet to direct a traffic controller driving a traffic light. The wireless router responds to a cell phone initiated by the app, by reporting the location and speed of the vehicle, often further including the vehicle type, such as a bicycle or heavy truck. The traffic controller may lengthen a green light in response to a heavy truck, to reduce wear on roadways. The access point may respond to a bicycle, by confirming its presence to the bicycle driver as well as adjust the traffic controller.

15 Claims, 2 Drawing Sheets

(56) References Cited

U.S. PATENT DOCUMENTS

| | | | | |
|---|---|---|---|---|
| 2015/0243165 A1* | 8/2015 | Elsheemy | ............... | B60R 25/00 |
| | | | | 340/906 |
| 2017/0309174 A1* | 10/2017 | Gonzales | ................. | G08G 1/09 |
| 2018/0128898 A1* | 5/2018 | Seler | ....................... | G01S 7/006 |

* cited by examiner

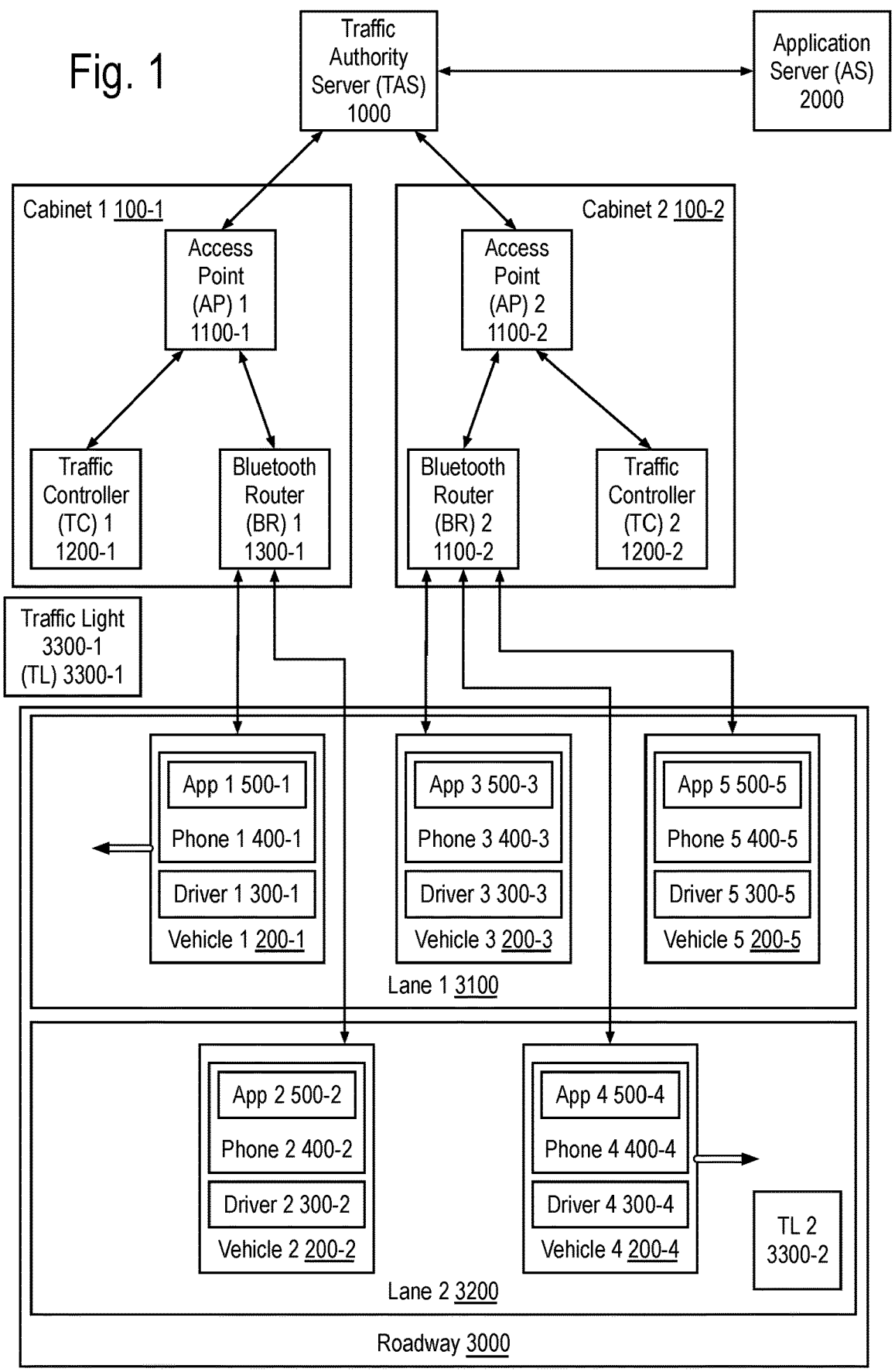

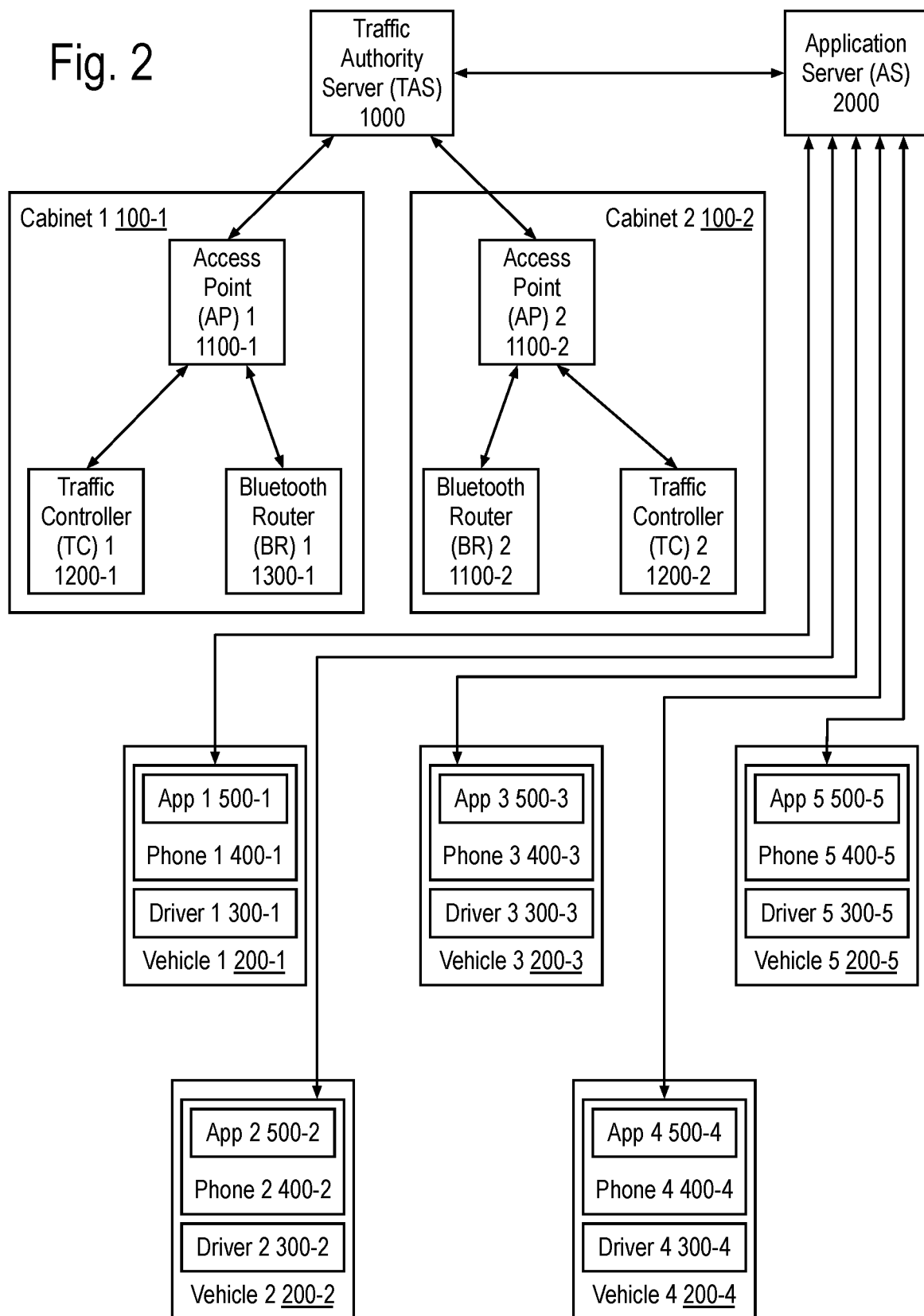

APPARATUS AND METHOD FOR TWO-WAY SIGNALING WITH TRAFFIC CONTROLLERS OVER A WIRELESS LINK

TECHNICAL FIELD

This document discloses application and the implementation of a system to allow remote signaling from bicyclists, truck drivers, or other vehicle drivers into a traffic controller through an access point (AP) communicating wirelessly with the user's cell phone. Remote signaling means that the traffic controller accepts a signal from a remote device outside its normal set of locally-wired (or wireless) pedestrian buttons and vehicle detectors for the purpose of knowing the presence or vehicle. The remote signal may come over a local area wireless network such as Bluetooth, or over a wide area wireless network such as cellular data. The signal may originate from a wireless device, a control system, a vehicle or any other entity not under the direct control of the city traffic department. The traffic controller may use this signal to effect the operation of the signals, including but not limited to extending green time for an approach, starting green time early on an approach or increasing yellow time or red times to ensure an intersection is clear before turning on a green light.

BACKGROUND

Traffic control systems are used to regulate the speed of vehicles at critical points on the road to improve traffic performance is to prevent collisions. The biggest application of traffic control is at intersections where vehicles may naturally crash into each other without some form of regulation. Modern traffic control at intersections is implemented by various means from the simplest, stop signs, to fixed timed traffic lights (i.e. no traffic sensors), to responsive traffic signal lights, where sensors are used to detect the presence of vehicles at the stop bar or at the mid-block locally controlling the operation of each signal, to the most complex adaptive control systems that use the density of traffic and traffic volumes to optimize the operation of each intersection dynamically for an entire city. In all cases other than stop signs and fixed signals vehicle detection is required.

When sensors are used for vehicle detection, the output of the sensor is typically a single bit, on or off, over time, which represents the presence of a vehicle at a specific place and a specific time. Typically, the output of each sensor is wired into a traffic controller so the controller knows that is vehicle is at the stop bar or may soon be at the stop bar so that the controller can expend a green cycle for the vehicle or start a green cycle earlier than normal.

SUMMARY

There are several technical problems, which the inventors have become aware of:

First, the placement of a vehicle detection sensor is fixed. The sensor usually cannot be moved without incurring costs to add new sensors or repositioning and/or realigning the sensor.

Second, certain vehicles, for example bicycles, can be very difficult to detect.

Third, a bicycle rider does not know whether they have been detected. The bicycle rider will often wait only so long at the intersection, before going through a red light, which often leads to deadly results.

Fourth, differentiating between vehicle types is very difficult with current technologies. For example, while it is advantageous for municipalities to extend green signal for large trucks at traffic controllers, so that they do not damage the pavement when they put on their brakes. Such a policy could extend pavement lifetime by years on intersections near ports or distribution centers. However, these policies cannot be implemented, because of the difficulty distinguishing heavy vehicles from others.

The system disclosed here, called "Give Me Green" by Sensys networks, the assignee, improves on the state of the art by:

Allowing detection zones to be defined as geo-fences using GPS technology. These fences can be reconfigured and reinterpreted without any physical changes to detection equipment mounted on or near the roadway and they can be adapted based on vehicle type or other real-time criteria. Thus, for example, the advance detection indication for a truck can be different than for a bicycle and different again for a standard car.

The state of the detection, i.e. whether a user was actually detected, is sent not only to the traffic controller but it is sent back to the user providing positive feedback that the traffic control system has seen (or not seen) the user. This should increase the overall reliability and safety of intersections.

Tagging detection by both user account and vehicle type so that special actions can be taken based on both a user permissions and vehicle type. This solves the issue of extending green for heavy trucks increasing pavement lifetime.

Additionally, the access point may further encode the message sent to the cell phone so that the application operating in the cell phone can indicate whether the message is authentically from the access point, and is not being fraudulently sent by a nefarious party. Such fraudulently sent messages could be applied across a city to trigger accidents affecting many bicyclists. These attacks could further be timed to have maximum affect upon the health of the city, as well as disrupt emergency services.

In addition to solving these existing issues, Give Me Green allows for progress in the adoption of autonomous vehicles, which will need to know the current state of the intersection (i.e. which color the traffic light is currently indicating). Give Me Green broadcasts this state information in real time to enhance any visual detection currently used by autonomous vehicles.

Signaling may also be bi-directional allowing the remote device to receive the state of the traffic signal (the current red/yellow/green of each approach) and/or the status of the detectors at the intersection as signaled from the AP. This signaling informs the bicyclist that the traffic controller has seen him and will react accordingly.

BRIEF DESCRIPTION OF THE DRAWINGS

FIG. 1 and FIG. 2 show examples of an application server communicating with a traffic authority server, as well as cabinets, access points, traffic controllers, Bluetooth Routers, traffic lights, vehicles, applications on cell phones, possibly drivers, lanes and roadways.

DETAILED DESCRIPTION OF THE DRAWINGS

FIG. 1 shows a simplified block diagram including a traffic authority server (TAS) 1000 communicating with an application server (AS) 2000. The TAS 1000 communicates with a first cabinet 100-1 and with a second cabinet 100-2. In many situations, these cabinets comply with a traffic control standard, such as some version of NEMA, which may vary from one country to another. The first cabinet 100-1 may include an access point (AP) 1100-1, a first traffic controller (TC), and a first Bluetooth Router (BR) 1300-1. The second cabinet 100-2 may include a second traffic controller (TC) 1200-2 and a Bluetooth Router (BR) 1300-2. The first traffic controller 1200-1 may communicate with a first traffic light (TL 1) 3300-1 situated to control traffic movement by vehicles in a first lane 3100. The second traffic controller may communicate with a second traffic light (TL 2) 3300-2 situated to control traffic in a second lane 3200. For simplicity, the first lane 3100 is shown with traffic movement going from right to left in the drawing. The second lane 3200 is shown with traffic movement in the opposite direction, from left to right. Both are shown as part of a single roadway 3000.

The first Bluetooth Router BR 1 1300-1 is shown wirelessly communicating with a first cell phone 400-1 in a first vehicle 200-1. The first cell phone 400-1 includes a first instance of an application 500-1, which is at least partly configured to direct the communication between the cell phone 400-1 with the BR 1 1300-1.

The BR 1 1300-1 is also shown wireless communicating the a second cell phone 400-2. The second cell phone 400-2 includes a second instance of the application 500-2, which is at least partly configured to direct the communication between the cell phone 400-2 with the BR 1 1300-1.

The first Bluetooth Router BR 2 1300-2 is shown wirelessly communicating with a cell phone 400-3 in a vehicle 200-3. The cell phone 400-3 includes an instance of an application 500-3, which is at least partI3 configured to direct the communication between the cell phone 400-3 with the BR 2 1300-2.

The first Bluetooth Router BR 2 1300-2 is shown wirelessly communicating with a cell phone 400-4 in a vehicle 200-4. The cell phone 400-4 includes an instance of an application 500-4, which is at least partI4 configured to direct the communication between the cell phone 400-4 with the BR 2 1300-2.

The first Bluetooth Router BR 2 1300-2 is shown wirelessly communicating with a cell phone 400-5 in a vehicle 200-5. The cell phone 400-5 includes an instance of an application 500-5, which is at least partI5 configured to direct the communication between the cell phone 400-5 with the BR 2 1300-2.

In this drawing vehicle 200-1, vehicle 200-3, vehicle 200-5 are traveling toward the first traffic light 3300-1. Vehicle 200-2 and vehicle 200-4 are traveling toward TL 3200-2.

The access point 1100-1 may be configured to receive messages from the BR-1 and through the TAS 1000 with the second access point 1100-2 to transfer messages regarding the location and speed of the vehicles. The second access point 1100-2 may be configured to receive messages from the BR-2 and through the TAS 1000 with the first access point 1100-1 to transfer messages regarding the location and speed of the vehicles.

By way of example, referring to FIG. 1, the first AP 1100-1 may send a message regarding the location and speed of vehicle 200-2 to the second AP 1100-2 to aid in the control of the second Traffic Light 3300-2. Similarly, the second access point 1100-2 may send one or more messages regarding the location and speed of the third vehicle 200-3 and/or the fifth vehicle 200-5 to the first access point 1100-1 to aid in control of the first traffic light 3300-1.

FIG. 2 shows the application server 2000 communicating with each of the cell phones of FIG. 1, in particular cell phone 400-1, 400-2, 400-3, 400-4, and 400-5. These communications do not necessarily happen at the same time, although they may. These communications may serve to initialize an installed package for the application 500, to configure each instance specifically, thereby creating app 500-1, 500-2, 500-3, 500-4, and 500-5. The installed packages may be received from an authorized and/or authenticated download server, possibly affiliated with the cell phone manufacturer in a certain country, such as the United States or China. The applications may also receive updates used by at least some of the installed apps 500-1 to 500-5. The updates may set a security seed which the installed and configured apps used to determine if the signals from the access points 1100-1 and 1100-2 are authentic. The security seed may or may not differ for each of the drivers 300-1 to 300-5.

Referring to FIG. 1, consider a first implementation of this technology to support accurate vehicle detection, without using expensive and often fixed sensor networks, stop bars and/or advanced detection sensors. In some situations, the vehicles 200-1 to 200-5 may 'own' the cell phones 400-1 to 400-3, allowing each vehicle to use this implementation to report their location and speed to the access points 1100-1 and 1100-2 using an existing radio technology, for example, the Bluetooth Routers 1300-1 and 1300-2. By way of example, some or all of the vehicles 400-1 to 400-5 may be autonomously driven vehicles. In other situations, drivers of one or more of the vehicles may own and operate the associated cell phone. For example, vehicle 400-1 may have a human driver 300-1 who owns and operates the cell phone 400-1. In another situation, the vehicle 200-1 may be rented to a driver 300-2, and the cell phone 400-2 may be owned by the rental company.

Consider a second implementation of this technology for drivers 300-1 to 300-5 operating vehicles 200-1 to 200-5. These vehicles are bicycles. The drivers are often referred to as bicyclists. This situation has been difficult for many sensors to detect. Using the created app 500-1 to 500-5, the traffic controllers 1200-1 and 1200-2 can accurately determine the location and speed of the vehicles 200-1 to 200-5. The access points 1100-1 and 1100-2 can use the Bluetooth Routers 1300-1 and 1300-2 to send messages to the cell phones 400-1 to 400-5, informing the respective applications 500-1 to 500-5 that they are being detected and accounted for by the traffic controllers 1200-1 and 1200-2. This gives the drivers 300-1 to 300-5 the assurance that the traffic lights 3300-1 and 3300-2 are correct. This in turn reduces the tendency for some drivers to become impatient, and attempt to cross against the traffic signal for their lane, which increases the probability of traffic accidents and injuries.

This second implementation may further support the application server 2000 on a possibly regular basis sending security updates as in FIG. 2. These security updates can be used by the apps 500-1 to 500-5 to calculate an authenticity assessment, to detect a possible cyber-attack, which could purposely cause an increase in bicycle related injuries.

Consider a third implementation to implement a policy to extend green for large trucks, for example, vehicle 200-4, so that they do not damage the roadway 3000 pavement when their brakes are applied. Such a policy could extend pavement lifetime by years on intersections near ports or distribution centers. In such implementations, the municipalities benefit from reduced wear and tear on the roadways 3000. The truck companies benefit from reduced fuel costs and from the ability to track the location of these large vehicles 200. The driver 300-4 benefits by getting more done in their shift, because they will have had to stop less often for traffic lights, such as traffic light 3300-2. Also, the trucker's app 500-4 may recognize the work schedule of the driver 300-4 and turn off notifying the Bluetooth Routers 1300-1 and 1300-2 of the vehicle 200-4 as a truck, so that the driver may walk near the intersection and not be mistaken as a heavy vehicle.

In other situations, the implementation may support a combination of any or all of the above discussed implementations.

The traffic authority server 100 may implement a database configured as a graph of intersections, where each intersection is represented as a map. Each of these maps includes a Global Position System (GPS) location for each approach to the intersection. The approach may be further represented by at least one of the following: a location of a through stop bar, a location of a left turn stop bar, a location of one or more through lanes, a location of one or more left turn lanes.

One or more of the maps may further include location of one or more tripwires for advance detection. The tripwires may be based upon crossing a position or an estimated time to the position, and may vary for the vehicle type associated with either the driver 300 or the vehicle 200.

One or more of the maps may include an identifier for an access point 1100-1 and/or for the associated Bluetooth receiver 1300-1. In some implementations, each access point 1100-1 and 1100-2, and possibly each Bluetooth Receiver 1300-1 and 1300-2 may be uniquely represented by these identifiers. These identifiers may be used in the messages to confirm the traffic controllers involved with the traffic flow in an area.

The traffic authority server may further issue certificates to validate the access point maps and keys.

The drivers may be required to register (i.e. get an account) with the AS to receive map information, updates, and security keys. Each user may have various vehicle types associated with their account.

Communications between the Access Points 1100-1, the TAS 1000 and the application server 2000 may not be reliable, because these communications often occur over public cellular data links. Experience has shown that such links routinely add delays of 10 seconds to one minute and occasionally go down for hours and sometimes days at a time. These delays and outages over the wide area communications network must be considered in the design and not assumed to be available all the time.

Connection to the centralized location is only required for map updates and key updates. Map updates occur very infrequently but key updates are required on a periodic basis. It is assumed here that communications should not go down for more than one day, so update times for keys are set to one day. However, if communications go out for a longer time then the current keys can be used indefinitely with a small decrease in system security. Once the data link to an access point 1100-1 or 1100-2 is restored, the keys can be updated and distributed to the Apps 500-1 to 500-5. The Access Point 1100 can be programmed to accept older keys when it sees that there is no communication with the Application Server 2000.

In one embodiment the local communications medium between the App 500 and the access point 1100 is Bluetooth, although in the future 5G local communications is also feasible. There are three requirements for this local communications link:

It is implemented on cell phones,
Transmission range is sufficient to cover the intersection and advance detection approaches; and
Communications can be managed locally (that is, communications can be achieved without requiring high reliability links between the access point and any other equipment). The local communications shall be able to operate autonomously at the intersection. Some 5G solutions will offer this level of reliability.

A broadcast message from the access point 1100 to an app 500 may include the following: An identification of the access point 1100 to allow the app 500 to filter broadcast messages from other access points. Intersection state and detection status for all approaches at the intersection. And a Message Integrity Check to validate the content, timing and origin of the messages.

The action messages from the App 500 to the access point, such as 1100-1, may include the following: An identification of the access point destination for the message. An identification of the user of the App, which is often a 32 bit value. An identification of the type of the vehicle 200, which is often a 32 bit value. An indication of the type of vehicle detection (i.e. which stop bar/trip wire was detected). A Message Integrity Code (MIC) which may provide error correction and/or detection, indicate encryption flags. The message may also include other information about the position of the cell phone 400.

- - -

In many implementations, before a user can use the system they must first download the App and register the App with the AS. Registration requires creating an account specific to that user on the AS. This operation is performed over a standard data link, either cellular or wifi or other depending on the capabilities of the cell phone.

When the user wishes to operate the App they press a button on the App GUI to start. Pressing start initiates the download of the appropriate maps and keys from the AS to the App. Normally maps up to some predefined radius around the current user are downloaded by default. This reduces the time to download and prevents the clutter of unused maps on the cell phone. Typical radius is 100 miles. As the vehicles moves the maps can be updated if the user has enabled that feature and there is sufficient cellular data or wifi coverage. Keys for each maps are also downloaded by the App.

After the App has downloaded the appropriate maps and keys it is ready for operation. No further data link is required for operation.

The App uses GPS on the phone to determine the location of the phone and then looks up the GPS location in its maps to determine if the phone is in an approach. This function may be improved using beacons capable of localizing the phone.

Once the App determines it is on an approach it listens on the Bluetooth advertising channels filtering on the AP_ID specified in the map database for the approach. The Bluetooth radio is configured to continuously broadcast the state of each approach on the intersection and the status of all the detection at the intersection. The App then looks at the map to determine the appropriate state and detection information relevant to the user.

When the App cross a trip wire specified in the map, it monitors the corresponding trip wire bit in the Bluetooth status and if set indicates to the user they have been detected.

If the bit is not set then the App sends an action message to the AP via the Bluetooth radio. When the AP receives the Bluetooth message it sets a detection bit to the traffic controller. The action message tells the AP that the phone has cross the trip wire and gives a indication of how far the phone is from the trip wire. The transmission of action messages continues until either the phone leaves the approach or the status bit for the trip wire changes from not detected to detected.

A similar process occurs when the phone enters the stop bar region, but in that case the phone continues to transmit, at a rate of 2 Hz, that it is present in the stop bar region. When the phone leaves the region the transmissions shall stop.

While most of the information communicated by the system over Bluetooth is public (e.g. signal state and configuration), and operation is intended to be open to all bicyclists, care still should be taken to allow for:
- A kill switch to disable inputs to the controller
- Communications over Bluetooth cannot forward through any traffic operations network (routing rules, port restrictions, ip restrictions etc.)
- A method to authenticate that the state and status information from the AP is not being spoofed by a fake AP.
- A method to allow a traffic authority to control access by user and vehicle type on a granularity of one day to one week.
- A method to validate data sent from the AS to the user is approved by the transit authority.

The method to authenticate may be accomplished by sending a public-key signature with each state and status message. The signature is computed using the data in the message in combination with the current time. A method such as Network Time Protocol (NTP) may be used to synchronize servers and apps to the required accuracy, which can be from 1 second to 10 seconds. For one embodiment, a Pairing Based Cryptography (PBC) library may be used for public key encryption. The public/private keys are regenerated periodically (for example every day) and downloaded to the App via the data link.

The method to allow the traffic authority to control access may be accomplished by a private shared key used to generate a Message Integrity Check (MIC) over the action message. The MIC also includes a timestamp to prevent replay attacks. The key for the MIC is generated using a secret key generated in the AP and transmitted security to the AS. The AS then generates a private key for each user/vehicle type and sends that key to the App via the data link. They key must be refreshed periodically, for example once a day. Since the AP has the original secret key and gets the user id and vehicle type in the action message, it can generate the same private key as the AS.

The method to validate data may be accomplished via a certificate generated by each TAS and sent to App via an internet connection (not shown). The certificate can then be used by the App to validate the origin of map data sent by the AS.

One or more implementations may require and/or use one or more of the following technologies, which may be specific to an area, municipality, user, nation and/or region:
- Speech recognition for "left" and "straight" and "right" etc. (optional—assumes traight)
- Exact sound of beep to bicyclist
- GPS trip wires on app
- Automatic determination of approach and distance on app
- Updating of intersection database (ala Pokemon Go) over cell data and/or Bluetooth.
- SSID access and Bluetooth routing
- Estimate time to red/green for playback to bicyclist
- User/password server infrastructure A method to regulate access to an access point 1100 may include the following: App gets ticket(s) from Application Servers that gives permission for fixed period of time (on order of hours) to a wide range of intersections. Other restrictions may apply to reduce abuse.

A processor at an intersection may validate the ticket with having to communicate with the application server and/or a specialized application authentication server, or any other server in real time.

The TAS may generate a big random number, referred to as K. The TAS may send K to the access point and to the Application Server. The Application Server may send the K to the Apps as part of a ticket, which also contain an identification of the Access Point. The App in communicating to the Access Point may send a representation of the K. The Access Point may compare the representation to the value of K to validate the communication from the App. Alternatively, the Access Point may send a second representation of the K to the App, which the App then compare to its value of K to authenticate communication from the access point.

Alternative implementations may use certificates and/or public key encryption.

In some implementations, rather than using Bluetooth, the communication through Bluetooth may be replaced by cellular data between the TAS to the Access Point, possibly restricted on the basis of location of the vehicle.

In some implementations, the Application Server 2000 is implemented as part of the Sensys Networks™ SNAPS™ software package implemented on at least one computer. No traffic application server is involved, all Aps are connected directly to the SNAPS via cellular modem. A dual radio transceiver such as Flex Control™ may be installed in a cabinet, such as cabinet 100-1. There may be a Universal Serial Bus (USB) interface in the Cabinet 100-1. The cabinet may also include one or more radio antennas. The app may include confirmation notification of advance detection and/or a stop-bar, which may be signaled to the driver by a beep and/or a vibration.

The application server may perform one or more of the following:
1. Manage bicycle user accounts (login, password, repassword, etc)
2. Log all transactions with users
3. Serve, possibly through the use of via https, intersection information based on GPS based request.
   1. Radius set table by application
   2. Method of updating information efficiently
   3. Per intersection information includes:
      1. Map of intersection with GPS locations
         1. Location of through stop bar
         2. Location of left turn stopbar
         3. Location of through lanes
         4. Location of left turn lanes
      2. Location of desired tripwires for advance detection
      3. Identifier of intersection Bluetooth
      4. Certificate issued by traffic authority to validate AP
   4. Serve, possibly via https, AP requests
      1. Intersection description information
      2. Logging of APup/down status
      3. Logging of Bluetooth requests by user The Bluetooth Receivers, possibly implemented as Flex-Control™ modules, may manage Bluetooth, generate calls to the traffic controller(s) 1200, log user information, and distribute public keys to the TAS.

At this time, the major cell phone manufacturers do not support adhoc networking. However, a number of relevant wireless protocols do, which can leverage cell phone radio transceiver, and in doing so, provide an alternative implementation to the Bluetooth Receivers described herein.

In some implementations, all the vehicles in an intersection may receive messages detailing the detected positions, speed and possibly vehicle types for all vehicles in the intersection.

The invention claimed is:

1. An apparatus, comprising:
   at least two access points configured to explicitly confirm to a driver of a vehicle that said vehicle is detected, each communicating with at least one associated traffic controller to direct a traffic light in response to a wireless message received from a cell phone without being delayed by a cellular data link for at least one minute initiated by an application, for said cell phone being moved by said vehicle near an intersection controlled by said traffic light; and
   a second vehicle driven by a driver operating a second application on a second cell phone to send a second wireless message to at least one of said access points, wherein said second message designates a second location and a second velocity of said second vehicle;
   wherein said wireless message designates the location and speed of said vehicle;
   wherein said cell phone receives a second response from said access point sent to said vehicle near said intersection explicitly confirming to a said driver of said vehicle that said vehicle has been detected; said second response includes a confirmation that said second response is authentic; and
   wherein said vehicle is a bicycle; and
   wherein said second cell phone receives a third message informing said second application that said second vehicle is being detected, to give said second driver assurance that said traffic light is correct as an authentication.

2. The apparatus of claim 1, wherein each of said at least two access points each operate a separate Bluetooth® router to communicate with said cell phone without relying upon said cellular data link to receive said wireless message to avoid said wireless message delayed by a cellular data link for said at least one minute.

3. The apparatus of claim 2, wherein said cellular data link is a public cellular data link.

4. The apparatus of claim 1, wherein the communication between at least one of said access points and said cell phone employs a communication protocol implemented on said cell phone, said communication protocol has sufficient transmission range to cover an intersection, and said communication is managed without requiring links between said access point and other equipment.

5. The apparatus of claim 4, wherein said communication between said access point and said cell phone operates autonomously at said intersection.

6. An apparatus, comprising:
   at least one access point configured to increase pavement lifetime near a traffic light thereby lowering maintenance expense for said pavement compared to an automobile, each of said at least one access point, communicating with at least one associated traffic controller to direct a said traffic light in response to a wireless message received from a cell phone without being delayed by a cellular data link for at least one minute initiated by an application, for said cell phone being moved by a vehicle near an intersection controlled by said traffic light;
   wherein said wireless message designates the location and speed of said vehicle;
   wherein said cell phone receives a second response from said access point sent to said vehicle near said intersection authentically confirming to a driver of said vehicle that said vehicle has been detected; and
   wherein said traffic light responds to said wireless message by lengthening a green light when said vehicle is a truck that shortens said pavement lifetime when stopped in response to said traffic light thereby lowering maintenance expense for said pavement compared to said automobile; wherein said apparatus further comprises
   a second vehicle is a bicycle driven by a driver operating a second application on a second cell phone to send a third wireless message to at least one of said access points, wherein said third message designates a second location and a second velocity of said second vehicle;
   wherein said second cell phone receives said second message and a fourth message informing said second application that said second vehicle being detected is authentic, to give said second driver assurance that said traffic light is correct.

7. The apparatus of claim 6, wherein said at least one access points operate a Bluetooth® router to communicate with said cell phone without relying upon a cellular data link to receive said wireless message to avoid said wireless message delayed by a cellular data link for said at least one minute.

8. The apparatus of claim 7, wherein said cellular data link is a public cellular data link.

9. The apparatus of claim 6, wherein the communication between at least one of said access points and said cell phone employs a communication protocol implemented on said cell phone, said communication protocol has sufficient transmission range to cover an intersection, and said communication is managed without requiring high reliability links between said access point and other equipment.

10. The apparatus of claim 9, wherein said communication between said access point and said cell phone operates autonomously at said intersection.

11. An apparatus, comprising:
    at least one access point configured to increase pavement lifetime near a traffic light compared to an automobile, each of said at least one access point, communicating with at least one associated traffic controller to direct said traffic light in response to a wireless message received from a cell phone without being delayed by a public cellular data link for at least one minute initiated by an application, for said cell phone being moved by a vehicle near an intersection controlled by said traffic light; and
    a second vehicle is a bicycle driven by a driver operating a second application on a second cell phone to send a third wireless message to at least one of said access points, wherein said second message designates a second location and a second velocity of said second vehicle;
    wherein said wireless message designates the location and speed of said vehicle;
    wherein said cell phone receives a second response from said access point sent to said vehicle near said intersection confirming to a driver of said vehicle that said vehicle has been detected and said second response is authentic;

wherein said traffic light responds to said wireless message by lengthening a green light when said vehicle is a truck that shortens said pavement lifetime when stopped in response to said traffic light compared to said automobile; and wherein said at least one access point communicates with said cell phone without relying upon said public cellular data link to receive said wireless message; and wherein said second cell phone receives said second message and a fourth message informing said second application that said second vehicle is being detected and said lengthening of said traffic light is authentic, to give said second driver assurance that said traffic light is correct.

12. The apparatus of claim 11, wherein said apparatus further comprises at least two of said access points configured to explicitly confirm to a driver of said bicycle that said bicycle is detected, each of said access points communicating with said associated traffic controller to direct said traffic light in response to a second wireless message received from a second cell phone without being delayed by a second cellular data link for at least one minute initiated by a second application, with said second cell phone being moved by said bicycle near said intersection controlled said traffic light; and wherein said second cell phone receives a third response from said access point sent to said bicycle near said intersection explicitly confirming to said driver of said bicycle that said bicycle has been detected.

13. The apparatus of claim 12, wherein said second application is essentially the same as said application.

14. The apparatus of claim 11, wherein the communication between at least one of said access point and said cell phone employs a communication protocol implemented on said cell phone, said communication protocol has sufficient transmission range to cover an intersection, and said communication is managed without requiring high reliability links between said access point and other equipment.

15. The apparatus of claim 14, wherein said communication between said access point and said cell phone operates autonomously at said intersection.

* * * * *